US008032111B2

(12) United States Patent
Dunne et al.

(10) Patent No.: US 8,032,111 B2
(45) Date of Patent: Oct. 4, 2011

(54) OVER-THE-AIR SERVICE TERMINATION FOR A TELEMATICS DEVICE

(75) Inventors: Kevin Francis Dunne, North Brunswick, NJ (US); James McHenry, Point Pleasant, PA (US); Bruce Joel Rappoport, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 12/945,245

(22) Filed: Nov. 12, 2010

(65) Prior Publication Data

US 2011/0059734 A1  Mar. 10, 2011

Related U.S. Application Data

(63) Continuation of application No. 11/819,187, filed on Jun. 26, 2007, now Pat. No. 7,873,345.

(51) Int. Cl.
*H04M 11/04* (2006.01)
(52) U.S. Cl. ............ 455/404.1; 455/419; 455/445
(58) Field of Classification Search .......... 455/404.1, 455/418, 419, 445
See application file for complete search history.

(56) References Cited

U.S. PATENT DOCUMENTS

| | | | |
|---|---|---|---|
| 6,076,028 A | 6/2000 | Donnelly et al. | |
| 6,549,770 B1 | 4/2003 | Marran | |
| 6,587,684 B1 | 7/2003 | Hsu et al. | |
| 6,778,821 B1 | 8/2004 | Shunk | |
| 6,912,396 B2 * | 6/2005 | Sziraki et al. | 455/456.1 |
| 7,200,390 B1 | 4/2007 | Henager et al. | |
| 2003/0211854 A1 * | 11/2003 | Mazzara, Jr. | 455/458 |
| 2004/0180647 A1 | 9/2004 | Schwinke et al. | |
| 2006/0079219 A1 * | 4/2006 | Nicolini | 455/423 |
| 2007/0254639 A1 * | 11/2007 | Chmielewski et al. | 455/419 |

OTHER PUBLICATIONS

"OnStar Technology", Mar. 26, 2007, URL: http//www.Onstar.com/us_english/jsp/explore/onstar_basics/technology.jsp#equipment, OnStar Corp.
Entire Prosecution of U.S. Appl. No. 11/819,187 to Dunne, et al., filed Jun. 26, 2007 entitled "Over-the-Air Service Termination for a Telematics Device".

* cited by examiner

*Primary Examiner* — Barry W Taylor
(74) *Attorney, Agent, or Firm* — McDermott Will & Emery LLP

(57) ABSTRACT

The disclosed technology automatically terminates wireless service that a mobile communication network provided to a telematics unit, e.g. when the customer is no longer active for telematics service. The disclosed deactivation allows the network service provider to reuse any resources, such as mobile numbers, that were previously assigned to the particular telematics unit. In a disclosed example, a SMS deactivation message causes the telematics unit to delete its mobile provisioning data, such as its MDN and/or its MIN, and replace that data with a dummy number. The deactivation procedure may also provide a replacement destination number for emergency calls, typically a cleared number, such as 911. For example, the deactivated telematics unit would be able to call a PSAP, and the PSAP would recognize that the unit is inactive for wireless service (and cannot be called-back) from the dummy number used to identify the unit.

15 Claims, 3 Drawing Sheets

FIG. 2
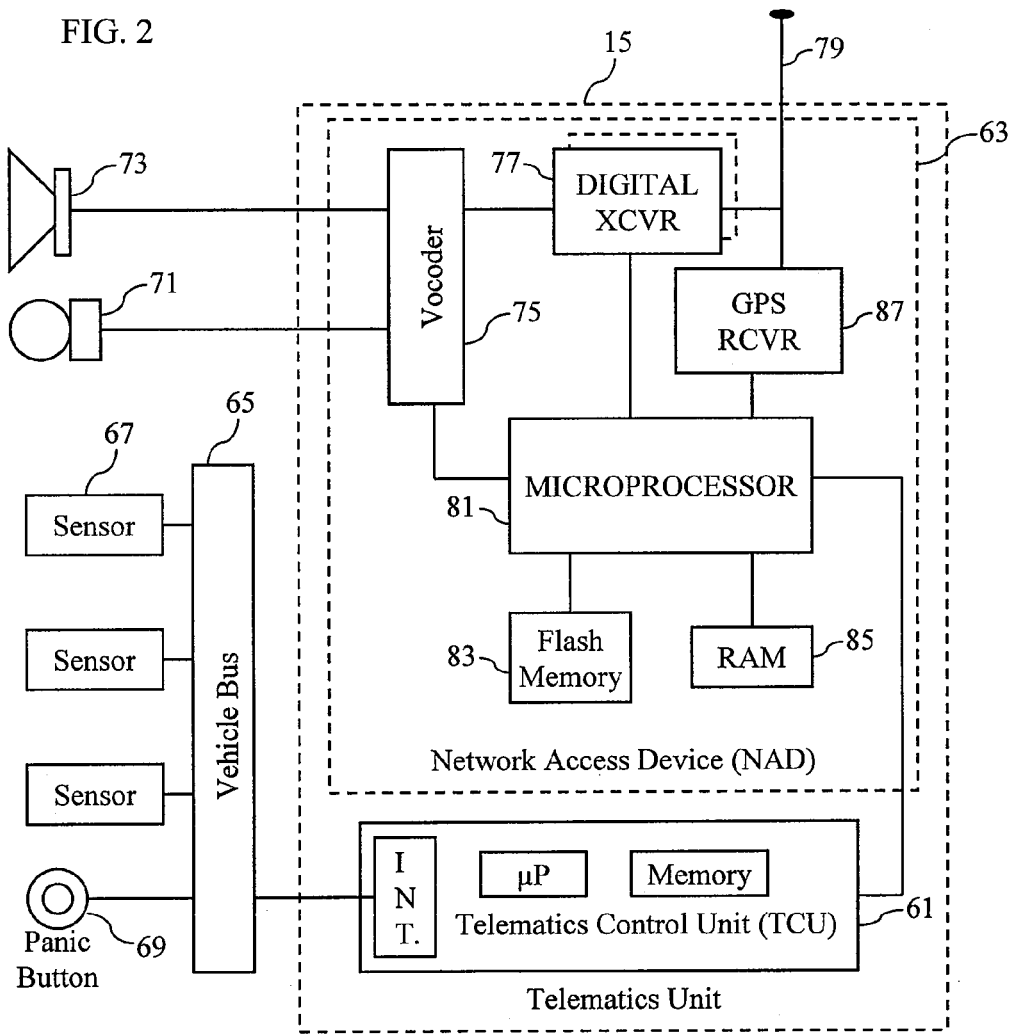
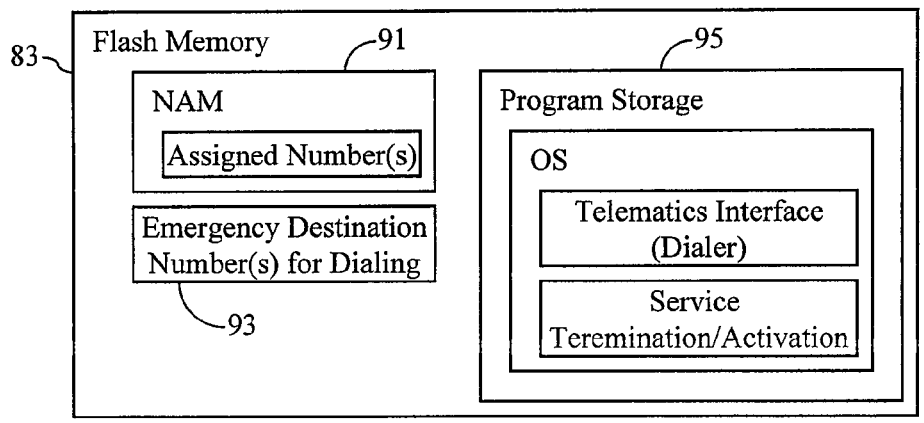
FIG. 3

OVER-THE-AIR SERVICE TERMINATION FOR A TELEMATICS DEVICE

RELATED APPLICATIONS

This application is a Continuation of U.S. patent application Ser. No. 11/819,187, filed on Jun. 26, 2007 now U.S. Pat. No. 7,873,345, the disclosure of which Application is incorporated by reference herein.

TECHNICAL FIELD

The present subject matter relates to techniques and equipment to automatically terminate service of a mobile or wireless communication network with respect to a telematics unit of an inactive telematics service customer, particularly in a manner that allows the provider of the associated wireless communication service for the telematics unit to reuse any resources, such as mobile numbers, that were previously assigned or dedicated to provide the service for the particular telematics unit.

BACKGROUND

In recent years, increasingly sophisticated telematics systems have been developed to detect an emergency condition or activation, and in response, initiate a call to a call center. Systems have been developed for monitoring fixed customer premises locations or personnel at specific site as well as for vehicle applications. For motor vehicle applications, for example, an on-board system monitors one or more sensors to determine when a crash or other emergency has occurred. Upon detecting an emergency condition, such as a crash, the on-board system activates a cellular transceiver to initiate a cellular telephone call to a call center of the telematics service provider (TSP). Upon connection to the call center, the system may communicate certain data, such as location determined by global positioning satellite (GPS) processing, identification data and crash related data. After the data transmission, the call is converted to a voice call in which a TSP representative at the call center can attempt voice communication with an occupant of the vehicle. The TSP also offers mechanisms for the representative to contact emergency service personnel in the area, to respond appropriately to the incident.

For mobile applications in vehicles, the primary communication resource is a cellular transceiver for communications via a public mobile wireless communication network, typically operated by a mobile service provider or carrier. Even some fixed location installations may utilize communications through a mobile service provider's network because the service is less likely to be interrupted by events that might otherwise damage landline network facilities at the location.

Typically, the telematics customer subscribes to the telematics service from a telematics service provider TSP. The TSP in turn contracts with a wireless service provider or carrier, so that the customer's telematics unit at the location or in the vehicle is active for wireless communication via the wireless carrier's mobile network. With respect to the communication service through the mobile network, the TSP is essentially a reseller of the carrier's wireless communication service. The customer's service will be active with respect to the TSP and the system or systems operated by the TSP. However, the customer's telematics unit also must also be active with respect to the carrier's wireless communication service through the mobile network, in essentially the same way as a mobile station of a regular subscriber to the carrier's wireless communication services.

Currently mobile or wireless devices on active accounts with the wireless carrier register on the mobile network and take up resources on the switching and signaling infrastructure of the network. The devices signal to/from network elements, to indicate current point of attachment and for station and/or user authentication.

With a normal mobile station, once its deactivated, the user will typically throw it away or at least will power it down and stow it away (e.g. for later use as a spare). In either case, the old mobile station is no longer operational and therefore does not attempt signaling/registration with the mobile network. Also, the mobile number(s) assigned to the station are assigned to another mobile station. A telematics device, particularly one for a vehicle application, typically remains installed and may remain powered and operational, even though the TSP and/or the wireless network may no longer recognize the device for purposes of providing services to the telematics unit. Today, telematics devices that have been deactivated by the TSP remain in the mobile network for an undetermined length of time with no automatic termination. For example, such devices continue to attempt signaling or registration communications with the network.

Currently mobile or wireless devices on active accounts with the wireless carrier are assigned one or more numbers for device authentication and related signaling purposes. Typically, a mobile station is assigned a mobile directory number (MDN) and a mobile identification number (MIN). The MDN is an actual telephone number. The MIN has a telephone number format but is typically a second number assigned to the device only for signaling purposes. At least the MIN and usually the MDN are programmed into the subscriber's mobile station, as part of the process of provisioning the device for operation through the wireless network. Association of those numbers with the subscriber and the subscriber's mobile station are also recorded in various databases used for service control, billing and the like in or otherwise associated with the wireless network. These numbers, particularly the MDNs, are resources available to the carrier on a limited basis. When a mobile station is deactivated, the carrier recovers the numbers for reuse, e.g. assignment to a different mobile station. In a typical deactivation procedure, e.g. when the subscriber replaces a mobile station with a new one, the carrier will delete the MDN and MIN from storage in the old mobile device.

As noted earlier, telematics devices that have been deactivated by the TSP often remain in the mobile network for an undetermined length of time with no automatic termination. For example, the units still retain any MDN or MIN numbers in storage. This is particularly troublesome in terms of inventory of mobile directory numbers (MDNs), because the inactive telematics unit is still provisioned on the wireless network, e.g. it still has a MDN assigned to it. Since the MDN is a particularly scarce resource, it is problematic in that the carrier can not re-assign the MDN to another mobile station or telematics unit.

Hence, a need exists for a technique and/or equipment to automatically deactivated telematics unit with respect to the wireless network, when such a device is inactive with respect to the telematics service. Such an automatic termination technique should enable the wireless service provider to recover MDNs or the like from the inactive devices. It would also be desirable for the automatic deactivation to stop the inactive telematics unit from signaling the wireless network, e.g. to reduce signaling traffic load on the network. However, it may be desirable to leave the telematics unit with some residual functionality, e.g. to allow some limited form of emergency call such as to 911.

SUMMARY

The teachings herein improve over existing art and address one or more of the above stated needs by providing an automatic technique for deactivating a telematics unit with respect to communication service through a wireless or mobile network. As a result, number resources of the network may be reclaimed from deactivated telematics units. The deactivation may also result in a reduction of signaling traffic that might otherwise be caused by the deactivated units.

For example, a method is disclosed for deactivating a telematics unit with respect to communication service through a wireless communication network. This method involves receiving a request to deactivate the service, which identifies the telematics unit; and in response to the request, generating a deactivation command message for the telematics unit. The deactivation command message contains at least one replacement number. The deactivation command message is transmitted through the wireless communication network to the telematics unit. Upon receipt of the deactivation command message, the telematics unit deletes a number from storage in its memory. The deleted number is one that the telematics unit previously used in its communication through the wireless communication network, i.e. while the telematics unit was active for wireless service. The telematics unit also stores a replacement number from the received deactivation command message in the memory in place of the deleted number. The stored number is one for use in a future attempt of the telematics unit to communicate through the wireless communication network, i.e. while the telematics unit is inactive with respect to communication service through the wireless communication network.

In the examples, the number replacement may serve to replace a network provisioned number assigned to the unit, such as a mobile directory number (MDN) and/or a mobile identification number (MIN) with a dummy number. In this way, the network can effectively recover its number resources for reassignment to other telematics units or to mobile stations. The number replacement, in the example, may also serve to replace a number that the unit would have used to dial the telematics service provider in the event of an emergency, while the unit was active. This later replacement number, however, may still allow some routing in the event of an emergency, e.g. 911 allows routing even from a deactivated device.

Another disclosed deactivation method involves changing status of information regarding the service for the telematics unit in the network to terminate service for the telematics unit through the wireless communication network, upon receiving a request to deactivate the network service for the identified telematics unit. A message, such as a short message service (SMS) message, is transmitted through the wireless communication network to the telematics unit. In response, the unit replaces a mobile number assigned to the telematics unit stored in memory, which had been used for authenticating the telematics unit for, communication service through the wireless communication network, with a dummy number that indicates that the telematics unit is a station not activated for communication service through the wireless communication network. The message also causes the telematics unit to replace a destination number of a call center of the telematics service provider, for use in initiating an emergency call, stored in memory of the telematics unit, with a cleared number. The cleared number is a dialable number for which the wireless communication network is configured to complete a call to a destination, without authentication of the telematics unit.

The detailed description also discloses an example of a telematics unit. The unit includes an interface for receiving signals from one or more input elements for monitoring with respect to possible occurrence of an emergency condition and a wireless transceiver for wireless communications through a mobile communication network. At least one processor is coupled to the interface and the wireless transceiver. A memory coupled to the processor(s) provides storage for a number assigned to the telematics unit by an operator of the mobile communication network and storage for a destination number for use in establishing an emergency through the mobile communication network. The memory also has program storage containing programming for execution by the processor(s), which enables control of operations of the telematics units so that the unit performs a number of functions. The functions include processing the signals received via the interface to detect occurrence of the emergency condition; and in response to detecting the occurrence of the emergency condition, the unit operates the wireless transceiver to initiate a communication attempt through the mobile communication network using the destination number and using the assigned number as an identifier of the telematics unit to the mobile communication network. In response to a deactivation command message received from the wireless communication network via the wireless transceiver, however, the unit replaces the assigned number and/or the destination number in the number storage with a number contained in the received deactivation command message.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a high-level functional block diagram of a telematics unit and associated equipment, as may be provided in a vehicle of a customer of the telematics service provider.

FIG. 3 depicts data/program storage within memory of the network access device of the telematics unit.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

As discussed herein, wireless service that a mobile communication network provided to a telematics unit is automatically terminated, e.g. when the customer is no longer active for telematics service. The disclosed deactivation techniques allow the network service provider to reuse any resources, such as one or more mobile numbers, that were previously assigned to the particular telematics unit. In a disclosed example, a SMS deactivation message causes the telematics unit to delete its mobile provisioning data, such as its MDN and/or its MIN, and replace that data with a dummy number. The deactivation procedure may also provide a replacement destination number for emergency calls, typically a cleared number, such as 911. For example, the deactivated telematics unit would be able to call a PSAP, and the PSAP would recognize that the unit is inactive for wireless service (and cannot be called-back) from the dummy number used to identify the unit.

Figure 1:
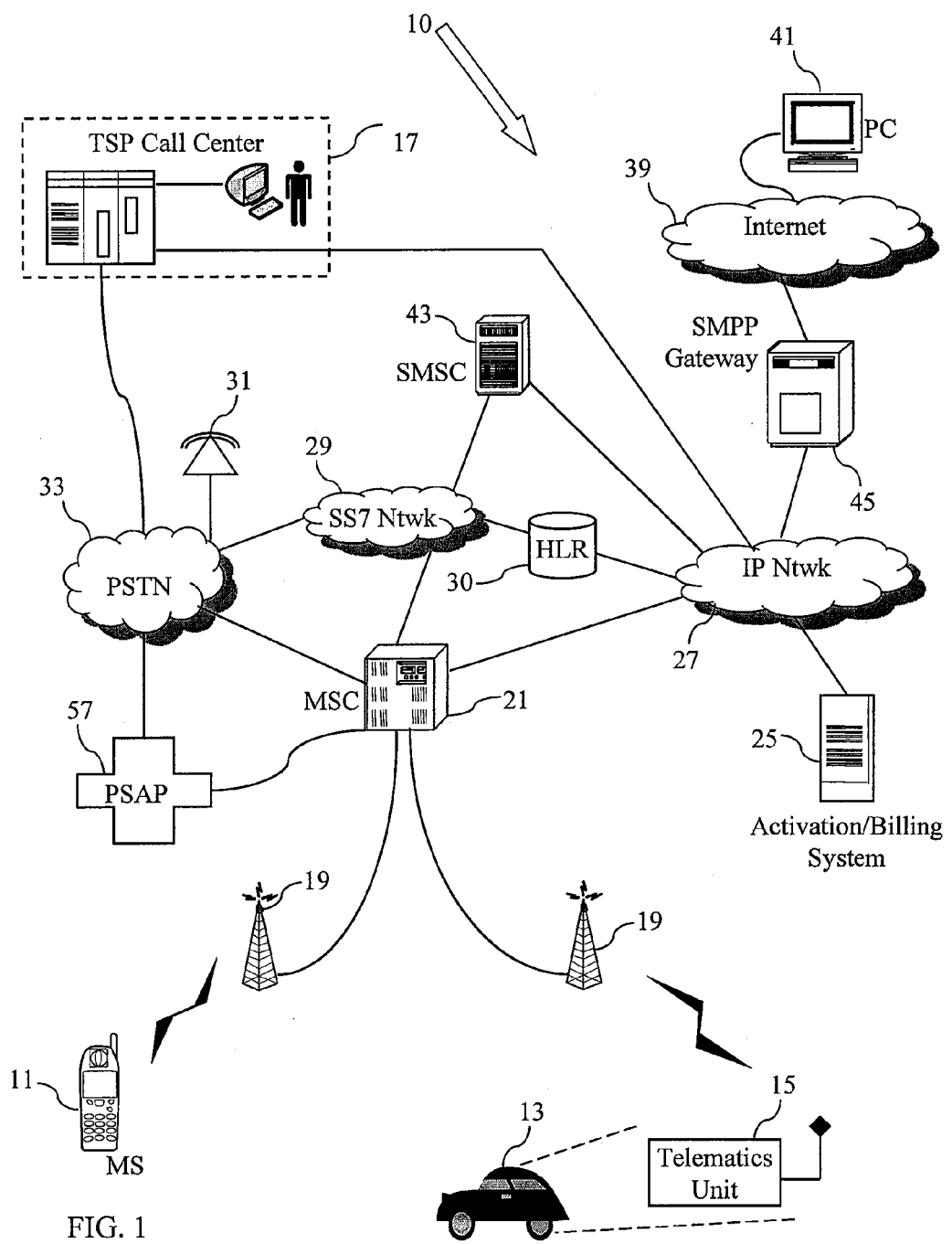
FIG. 1 is a high-level functional block diagram, showing a telematics unit, a TSP call center and a mobile wireless network providing communications between the telematics unit and the TSP call center.

Reference now is made in detail to the examples illustrated in the accompanying drawings and discussed below. FIG. 1 is a functional block diagram of system 10 of networks and other equipment for providing wireless communication services for mobile stations 11, and those communications also support telematics communications for reporting emergencies and/or for service activation or deactivation functions. Although applicable to fixed location telematics communications, the example provides such communication for vehicle applications such as automatic crash notification. Hence, the drawing shows a vehicle 13 having an associated telematics unit 15 configured for crash detection and related emergency communication functions. The emergency communications extend through a wireless network offering mobile communication service, to data and voice communication equipment at a TSP call center 17. In a typical operation, the telematics unit 15 will detect a vehicle condition indicating a crash or other emergency condition of the vehicle 13 or will detect actuation of an "emergency" or "panic" button associated with the telematics unit 15 by an occupant of the vehicle. In response, the telematics unit 15 initiates communication through the mobile communication elements of the system 10 with the TSP call center 17.

To make a telematics call to the center 17 through the mobile communication network, an active telematics unit 15 must appear to the network as a mobile station (similar to station 11) of a valid subscriber. Hence, the telematics unit must be activated for service, not only with respect to the TSP 17, but also with respect to the mobile wireless communication network. When the network activates a mobile station 11, or in this case a telematics unit 15, the network assigns MDN and MIN numbers to the particular wireless device. Typically, service activation entails loading at least the MIN into the mobile station 11. The network uses the MIN to authenticate the device 11 or 15 for service. The MIN is used for signaling between the network and the device but is not the dialed number of the mobile station or telematics unit. The network uses the MDN to route calls to the device and to identify the device to other parties, such as the TSP call center or a PSAP; and a network authentication element matches a MDN to the MIN, as or when needed in call processing. In some implementations, the MDN is programmed into the wireless device, and in such networks, the telematics unit 15 would be programmed with both its MIN and MDN. The disclosed deactivation deletes the number assignments from nodes of the network; and in particular, deactivation replaces the assigned number or numbers stored in the telematics unit 15 with a different non-active number, referred to as a dummy number.

Dialing, at least for an emergency call from the telematics unit 15, uses one or more destination numbers of the TSP call center 17. Deactivation may also replace the destination number or numbers stored in the telematics unit 15 with an alternate destination number. In the examples, the alternate destination number is a cleared number. Hence, when inactive, the wireless network will not authenticate the telematics unit for communication (e.g. no valid MIN/MDN), however, the mobile network may allow some limited communications, e.g. based on dialing of a "cleared" number.

Before discussing deactivation procedures for telematics units 15, it may be helpful to first discuss the elements of the exemplary system 10 in somewhat more detail. In many areas today, one or more wireless service providers or carriers operate base stations and switches to provide mobile communications services over a radio airlink for mobile stations 11. The example shows a limited number of such elements of one carrier's mobile network. Hence, in the example, the carrier operates a number of base stations 19 and a mobile switching center (MSC) 21, to provide mobile wireless communication services to mobile stations 11 operating within areas or regions served by the radio coverage of the base stations 19. Each base station 19 typically includes a base transceiver system which communicates via antennae of the base station and over the airlink with the mobile stations 11, when within range. To the base stations 19, the wireless transceiver of the telematics unit 15 appears as another mobile station.

Today, most versions of the MSC 21 provide circuit switched communications to/from mobile stations 11 and other networks or elements, although newer switching systems are being deployed that utilize packet switching technologies. Each wireless service provider's network typically includes a base station controller functionality that controls the functions of a number of base stations and helps to manage how calls made by each mobile station are transferred (or "handed-off") from one serving base station to another. Each wireless network equipment vender implements this function differently. Some vendors have a physical entity, which they call a base station controller, while other vendors include this functionality as part of their switch that forms the MSC 21. Each service provider's facilities may offer somewhat different services, e.g. voice call, text messaging, data or various combinations of these and other services. Also, the service providers will have different agreements in place as to how to treat each others' subscribers when roaming through the various networks.

In the example, the wireless service provider's network offers voice telephone service between mobile stations 11 as well as between a mobile station 11 and a telephone such as 31 through the public switched telephone network (PSTN) 33. The network offers the similar voice service to units of the TSP, and through the TSP to customers having active telematics units 15. However, the principle telematics usage is for calls from the telematics units 15 to the call center 17 of the TSP, to report emergencies.

Typically, the mobile station 11 or the telematics unit 15 is programmed with both the assigned MDN and the MIN numbers. However, in operation, it is the MIN that the base stations 19 broadcast over the signaling channel, e.g. to page the appropriate mobile station 11 when there is an incoming call (based on a caller dialing the MDN). The MIN is also used in registration signaling and in signaling of calls from a mobile station 11, and the telematics unit 15 uses its MIN during registration signaling as well as signaling for outgoing calls (e.g. emergency calls to the TSP call center 17).

As part of its management of customer account information, the wireless service provider also operates one or more computers implementing activation and billing functions. For discussion purposes, the drawing shows such an activation/billing system 25. The billing system maintains a record for each subscriber device that is activate for service through the provider's wireless mobile communication network, in this case including both mobile stations 11 and telematics units 15. The record of a telematics unit 15 in the system 25 will indicate that the unit is a telematics unit, e.g. by association with the TSP. The record for each device also includes various subscriber information and related billing information, as well as device identification information (such as an electronic serial number—ESN) and information as to one or more numbers that the network assigns to a mobile station 11 or to a telematics unit 15 upon service activation.

Service deactivation may entail deletion of the appropriate record in the activation/billing system 25, although typically, the record will be maintained by the data in the record will be changed to show the inactive status of the customer and the customer's device 11 or 15. In the later case, the record would be modified, for example, to terminate the assigned of a MDN and/or a MIN to the deactivated device. As discussed more later, the deactivation processing by the system 25 with regards to a telematics unit 15 also causes that system to initiate communications with the 15, to complete the deactivation by reprogramming certain data in the telematics unit.

The carrier typically operates or has access to a secure packet switched data communication network, shown as an Internet Protocol (IP) network 27 in the drawing, for a variety of data communication purposes in support of operations of the wireless mobile communication network. Of note for purposes of this discussion, the activation/billing system 25 connects to the IP network 27 for communications of data needed to activate service for a mobile station 11 or a telematics unit 15 to various elements of the wireless communication network. If a secure link can be provided, e.g. through a firewall or the like (not shown), the IP network 27 may also allow the TSP to communicate with the activation/billing system 25, to activate or terminate wireless communication service with respect to one or more of the telematics units 15. Although shown as a direct link for convenience, the data communications of the TSP may go through the Internet 39.

The carrier also operates or connects to an interoffice signaling network, such as a signaling system 7 (SS7) network 29. The signaling network allows exchange of signaling messages between MSCs 21, between an MSC 21 and other network control elements and between elements of the carrier's network and other networks, such as switching offices of the PSTN 33 during call set-up and tear-down. A typical SS7 network comprises ISDN links and ISDN packet switches referred to as Signaling Transfer Points (STPs).

To control service authorization and provide program control for certain advanced service features, the carrier operating the wireless network also operates a home location register (HLR) 30 that stores subscriber profiles and related call processing control information for each of that carrier's wireless subscribers and their associated mobile stations 11. Registration operations also serve to provide data identifying the MSC 21 currently serving each mobile station, to facilitate routing of calls to roaming mobile stations. The HLR 30 will store similar data for the telematics units 15 of the TSP, that is to say for the units 15 of the TSP's telematics service subscribers. The HLR 30 may reside in the home MSC, however, in the example, the HLR 30 resides in a centralized node sometimes referred to as a service control point (SCP). The SCP communicates with the MSCs 21 via data links and one or more STPs (not separately shown) of the SS7 network 29. Of course, there may be multiple computers distributed throughout the network for performing the HLR function. Also, the platform implementing the HLR function may communicate with the MSC using other data communication technologies.

As recognized in the art, the HLR 30 stores for each mobile subscriber the subscriber's mobile telephone directory number (MDN), the mobile identification number (MIN) and information specifying the wireless services subscribed to by the mobile subscriber. In a similar fashion, the HLR 30 stores MDN and MIN information regarding each active telematics unit 15. For example, the telematics unit uses the MIN in its signaling communication with the MSC 21, the HLR 30 authenticates the telematics unit 15 based on the MIN, and the HLR 30 translates the MIN to identify the MDN associated with the telematics unit 15, in essentially the same manner as would be done for any active mobile station 11. For example, when initially activated, the activation/billing system 25 provides one or more instructions to the HLR 30 to set-up the appropriate record for a telematics unit 15. Deactivating a telematics unit 15 should recover the MDN and MIN number resources for re-use by the carrier, therefore the termination processing will delete the record of the deactivated telematics unit 15 (including the MDN and MIN) from the HLR 30.

When the carrier deactivates the telematics unit 15, the activation/billing system 25 will also deactivate the MIN/MDN number(s) in any network nodes, e.g. by deleting the subscriber record from the HLR 30. At least the MDN is recovered and available for reuse. Hence, in the specific example using the HLR 30 for call routing control and associated device authentication functions, as part of service termination for a deactivated unit 15, the activation/billing system 25 provides one or more instructions to the HLR 30 to delete the call processing record for the deactivated telematics unit 15. The network will no longer associate the MDN with the particular station, in this case the deactivated telematics unit 15. Since the telematics unit 15 no longer has a valid MIN, the base stations 19 and MSCs 21 no longer generate authentication processing with regard to signaling to/from that unit, which also reduces signaling communications through the network. The MDN and/or MIN may be reassigned for use by other wireless communication devices.

As noted, the telematics unit 15 (like a mobile station) is programmed with its MIN and typically with its MDN as well. Hence, when a telematics unit 15 is deactivated, the network also sends a deactivation command that causes the telematics unit 15 to delete the MIN and/or MDN data from its memory. Wireless carriers have developed a text messaging service known as Short Message Service or "SMS." In an example discussed more later, the deactivation of a telematics unit 15 will utilize SMS message to communicate the deactivation command to the telematics unit. To insure full understanding of the example, it may be helpful first to summarize a typical implementation of the SMS service in a mobile communications network.

The SMS service normally transmits text messages for display on the mobile stations 11. The SMS service also offers the capability to send text messages from a mobile station 11 to another party, typically another mobile station user or via the Internet 39 to a party using a personal computer (PC) 41. In a typical implementation, SMS communications to/from a mobile station (MS) 11 use a signaling channel over the airlink and use out-of-band signaling resources of the mobile phone network, such as the SS7 network 29, for transport to/from a server platform referred to as a SMSC (Short Message Service Center) 43. The SMSC 43, for example, receives SMS or packet communications containing text messages and forwards the messages via the SS7 signaling network 29 to the serving MSC 21; and the MSC forwards the message to a base station 19 for transmission via the signaling channels over the air to the appropriate destination mobile station 11. The SMSC 43 will also receive similar messages from the mobile stations 11 and forward them to servers or terminal devices accessible via an Internet Protocol (IP) packet data network, for example via network 27, a Short Message Peer-to-Peer Protocol (SMPP) gateway 45 and the Internet 39 to the PC 41.

A SMS message is directed to a mobile station 11 based on a sender input of the station's MDN. As with a voice call, signaling to/from the mobile station, for SMS communication uses the MIN of the mobile station.

Mobile carriers and third parties have used SMS message communications as transport for other types of communications to and from mobile stations 11. For example, a SMS message has been used to carry an instruction to a mobile station 11 to wake-up a certain resident application to cause the mobile station 11 to take a desired action (e.g. to retrieve data for the user from a server). The telematics service termination processing takes advantage of the SMS message capabilities of the mobile communication network to communicate a deactivation command message through the wireless communication network to the telematics unit 15. Upon detection of the deactivation command in a received SMS message, the telematics unit 15 deletes one or more numbers from storage in its memory and replaces the deleted number(s) with one or more new number(s) from the deactivation command.

In specific examples discussed in more detailed below, the deactivation command causes the telematics unit 15 to delete any MDN and/or MIN numbers from memory and replace that number data with a dummy number from the deactivation command. The command may also cause the telematics unit 15 to replace a destination number that it would previously have used to call the TSP call center 17, stored in memory of the telematics unit, with a cleared number. The cleared number is a dialable number for which the wireless communication network is configured to complete a call to a destination, without authentication of the calling device, in this case without authentication of the deactivated telematics unit 15.

For 911 emergency calls from mobile stations 11, and thus for at least an inactive telematics unit 15, the system 10 also includes a public safety answering point (PSAP) 57. Typically, the PSAP 57 is a call center for receiving voice calls from landline and wireless telephone stations. The PSAP typically includes data systems for determining the location of the 911 caller. For mobile network applications, each MSC switch 21 is configured to route a 911 call from a mobile station 11 served by that switch to a PSAP 57 for the surrounding jurisdiction(s). 911 is an example of a cleared number, and the deactivation procedure may substitute 911 for the destination number that an active unit 15 uses to call the TSP call center 17. Hence, even after deactivation, the telematics unit 15 will be able to initiate a call upon detection of an emergency using the cleared number, for example, a call to the PSAP 57 using 911 as the dialed destination number.

At a high-level, when a telematics customer is no longer subscribing to the telematics service, the TSP terminates service with respect to the customer's telematics unit 15, in accord with its normal procedures. However, the TSP will also notify the carrier that operates the wireless network providing mobile communication services to the telematics unit, by sending a request to deactivate the service, which identifies the telematics unit, to the activation/billing system 25.

The carrier wants to terminate mobile service to the telematics unit 15 and recover any assigned resources. In general, the activation/billing system 25 initiates wireless network processing to terminate service with respect to a telematics unit 15. The system 25 receives a request to deactivate the service from the TSP, e.g. from equipment at the TSP call center or at other TSP business facilities. The deactivation request identifies the particular telematics unit 15. In response to the request, the activation/billing system 25 alters its internal records appropriately, and the system 25 instructs other network elements as necessary to terminate network service with respect to the particular unit 25, e.g. by system instructions to the HLR 30 and/or the home MSC 21 to delete any records used for processing calls for that unit.

The deactivation request from the TSP also causes the activation/billing system 25 to generate a deactivation command message for the telematics unit 15. The deactivation command message contains at least one replacement number. The deactivation command message is transmitted through the wireless communication network to the telematics unit 15. In the example, the activation/billing system 25 sends the deactivation command message to the SMSC 43, which generates an SMS message addressed to the telematics unit 15. The SMSC 43 sends the SMS message containing the deactivation command to the MSC 21, which forwards it over-the-air to the telematics unit 15. Upon receipt of the deactivation command message, the telematics unit 15 deletes a number from storage in its memory. The deleted number is one that the telematics unit previously used in its communication through the wireless communication network, i.e. while the telematics unit was active for wireless service. The telematics unit also stores a replacement number from the received deactivation command message in the memory in place of the deleted number. The stored number is one for use in a future attempt of the telematics unit to communicate through the wireless communication network, i.e. while the telematics unit is inactive with respect to communication service through the wireless communication network.

Hence, the activation/billing system 25 is the network or carrier element that receives the request for termination from the TSP and responds by initiating various activities intended to terminate wireless communication service with respect to the particular telematics unit 15. In the illustrated example, the activation/billing system 25 may be implemented using a general class of data processing device commonly used to run "server" programming. The TSP call center 17 may use a server as well as data terminal devices, such as personal computers. In each case, general purpose computer hardware is programmed to perform its respective server processing operations as discussed herein and to control the attendant communications via the network(s). A server, for example, includes a data communication interface, e.g. for packet data communication via the IP network 27. The server also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

In the example, the activation/billing system 25 sends the deactivation command through the network to the telematics unit 15, as an SMS message addressed to the MDN of the particular telematics unit, to effectively disable the device. The trigger of the SMS message, from the activation/billing system 25, is initiated automatically by the system 25 upon deactivation of the service by the subscriber or the TSP. The length of time prior to sending out the deactivation command message may be a configurable parameter which would be set in the activation/billing system 25. The deactivation communication with the telematics unit will automatically insert a default or "dummy" number into memory in the unit, so that it adheres to the FCC guidelines with regard to Phase 2 E911 compliance once the device is no longer active on the mobile wireless network. Specifically, the SMS message serves to replace the mobile number data in the telematics unit 15 (MDN and/or MIN) with the FCC mandated dummy number to retain E911 compatibility.

911 is an example of a "cleared number." A cleared number is a number programmed into the switch(es) of the mobile network to cause the network to complete call to that number regardless of whether the calling device is a validly provisioned device for receiving active service through the network. When a device dials a cleared number, the network does not do any authentication of the device, e.g. based on MIN or MDN. However, if the device is inactive, the network will not permit other calls to or from the device, whether the device is a mobile station or a telematics unit.

In normal operation, the telematics unit 15 dials a number for the TSP call center 17 upon detecting an emergency. The TSP number is programmed into memory of the telematics unit. The memory may store several such destination numbers, for sequential dialing if one or more call attempts should fail. However, when deactivated as outlined above, a cleared number is programmed into the memory of the telematics unit in place of the normal number for the TSP call center 17. The cleared number may be an alternate number for the TSP but typically would be 911. Hence, upon detection of an emergency, the telematics unit would automatically dial 911, and the network would route such a call to the PSAP 57.

As discussed above, a dummy number is programmed into the telematics unit in place of the number the network previously used to identify the unit, e.g. in place of the MDN and/or the MIN. When the PSAP receives a 911 call from the unit, it receives the dummy number (rather than the MDN) and can recognize from the dummy number that the call is from a device that is not active for mobile network communications. For example, personnel at the PSAP will recognize that they can not call back to the device user and must keep the session/call up continuously until the emergency has been addressed.

A number of the activities involved in the service termination are implemented by communication with the telematics unit 15 and/or involve responsive processing in that unit. It is assumed that those skilled in the art are generally familiar with the structure, programming and operations of mobile stations and telematics units that utilize mobile communication transceivers similar to those of mobile stations. However, to fully understand the relevant communication and processing under discussion here, it may be helpful to some readers to consider a summary discussion of the structure and programming of an example of a telematics unit, before discussion of a detailed example of a process flow of a service termination.

FIG. 2 is a functional block diagram of an exemplary telematics unit 15 and associated equipment, as may be used in a vehicle 13 shown in FIG. 1. The telematics unit 15 includes a telematics control unit (TCU) 61 and a wireless Network Access Device (NAD) 63. The TCU 61 may be implemented as a microprocessor (µP) with one or more memories, interfaces, and programming to implement the emergency monitoring and notification functions. Programming in the memory of the TCU 61, for example, enables the TCU microprocessor to process the signals received via a vehicle interface to detect occurrence of the emergency condition, and in response to detecting the occurrence of the emergency condition to instruct the NAD 63 to initiate an emergency call.

A vehicle 13 (FIG. 1) typically includes a vehicle bus, shown at 65 in FIG. 2, for providing digital data communications among various on-board devices/systems, particularly for vehicle diagnostics purposes. For crash detection, the vehicle includes one or more sensors 67 for detecting conditions that may relate to a crash, and the vehicle bus 65 provides the continuous electrical connection within the vehicle for the communication of diagnostics data from the sensors 67 to the TCU 61. The TCU 61 is programmed to process data received from the sensors 67 to determine if there has been a crash and to generate data regarding the detected crash, e.g. to indicate severity. The vehicle may also include a panic button 69, coupled to communicate with the TCU 61 via the vehicle bus 65. A vehicle occupant would activate the panic button 69 in the event of a condition that the occupant perceives as an emergency. The TCU 61 determines that there has been an emergency event warranting an automatic report to the TSP call center, in response to crash detection from the processing of the data from the sensor(s) 67 or in response to activation of the panic button 69. In response to any determination of an emergency, the TCU 61 activates the NAD 63 to initiate the communication with the TSP call center 17. The NAD 63 acts as the communications tool for entry to the wide area wireless network via cellular communications.

The NAD 63 is a wireless transceiver unit configured for communications via the wireless communication facilities of the mobile network and associated landline facilities that make up the system 10 of FIG. 1. The NAD 63 is generally similar to a wireless mobile station 11 configured for voice and data communications. It is assumed that those skilled in the art are familiar with the structure and operation of mobile stations and thus with the structure and operation of generally similar devices that may be used to implement the NAD 63. To insure a full understanding by all readers, however, it may be helpful to consider a high level summary review of the relevant structure of one example of a NAD 63.

The NAD 63 supports both data communication and voice communication. For the voice communication function, the vehicle will include a microphone 71 for audio signal input and a speaker 73 for audio signal output. The microphone 71 and the speaker 73 connect to voice coding and decoding circuitry (vocoder) 75 within the NAD 61. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The concepts discussed here encompass embodiments of the NAD 63 utilizing any digital transceivers that conform to current or future developed digital wireless communication standards. For example, the transceiver 77 could be an EVDO, TDMA or GSM unit designed for cellular or PCS operation. In the present embodiments, the digital transceiver 57 is a CDMA transceiver compatible with operation via an IS-95 network or a 1x-RTT network, to provide both voice and/or data communications. As discussed more, later, such transceivers also support SMS message communications, in this case, for receipt of a message containing a termination command.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. These signaling messages, for example, also enable SMS communications. The transceiver 77 connects through RF send and receive amplifiers (not separately shown) to an antenna 79. The NAD 63 may include one or more additional transceivers, as shown in dotted line form, for operation in an analog mode or in accord with an alternative digital standard, such as EVDO.

A microprocessor 81 acts as a controller for controlling all operations of the NAD 63. The microprocessor 81 is a programmable controller. The NAD 63 also includes flash type program memory 83 and/or a non-volatile random access memory (RAM) 85, for storing various software routines and mobile configuration settings, for use by the microprocessor 81.

FIG. 3 is a high level representation of the storage that may be provided by the flash memory 83 and thus of relevant data and programming that may be stored and/or loaded into portions of the flash memory 83. As shown, a portion 91 of the memory 83 is designated as a number assignment module (NAM). The NAM 91 stores one or more numbers assigned to the NAD (much like assignment to a mobile station 11), to enable wireless communication through the base stations 19 and the MSCs 21 of the mobile network. Typically, the NAM 91 will store the assigned mobile identification number (MIN) and may stored a separate mobile directory number (MDN), which are assigned to a mobile station, or in this case to the NAD 63 in the telematics unit 15. Initial provisioning for an activated device (e.g. an activated unit 15) entails appropriate programming of the network elements to support services through the customer's wireless service provider's own network and may include some programming of the particular telematics unit 15, e.g. to store its assigned MIN/MDN in the NAM 91 in the flash memory 83.

Another portion 93 of the flash memory 83 stores at least one destination number for dialing with the TCU 61 detects an emergency. When active, this portion 93 will store at least one number assigned to the TSP call center 17, for use in dialing that center 17 upon TCU detection of an emergency. The number storage of an active unit 15 may contain two or more such destination numbers, to allow the telematics unit to make one or more alternative calls in the event a call using the first number fails. However, when a telematics unit 15 is deactivated, the destination number(s) from storage 93 are deleted and replaced with a cleared number, such as 911.

Storage is also provided for programming that is to be executed by the microprocessor 81 of the NAD 63. Although other storage could be provided, in the example, a portion 95 of the flash memory 83 stores the programming. The programming typically includes an operating system (OS) including various device drivers for the hardware of the NAD 63. The programming will also include a telematics interface application running on the OS, to enable the microprocessor 81 to communicate with the TCU 61 and to implement the NAD functions related to telematics communication, under control by the TCU 61. For example, this application would cause the microprocessor 81 to automatically dial the emergency destination number from storage 93, in response to a command which the TCU 61 would generate in the event the TCU detects an emergency.

The program storage 95 also includes an application program for controlling service activation and deactivation functions of the NAD 63. For example, the execution of this programming by the microprocessor 81 enables the microprocessor to control operations of the telematics unit 15 to respond to a deactivation command message received from the wireless communication network via the wireless transceiver 87, by replacing an assigned numbers in storage 91 and/or a destination number in the number storage 93 with a number contained in the received deactivation command message. In a specific example, this programming causes the microprocessor 81 to replace the destination number(s) in storage 93 with a cleared number and to replace the assigned MIN and/or MIN number(s) in NAM storage 91 with a dummy number. The cleared number and the dummy number are numbers that the NAD receives in the SMS deactivation command message received from the wireless communication network, that is to say via the transceiver 77.

Those skilled in the art will recognize that the distribution of programming as between the TCU and the NAD is only given here by way of example. Programming functions may be shifted between these two elements of the telematics unit 15. For example, the actual emergency dialing program implemented by the telematics unit may be stored in the flash memory 83 of the NAD 63 or this programming may be stored in program memory of the TCU 61. Another approach might integrate the TCU and NAD into a single unit and thus combine programming for those elements.

Returning to FIG. 2, for position determination, the NAD 63 also includes a GPS receiver 87. Under control of the microprocessor 81, the GPS receiver 87 receives and processes signals from one or more satellites of the GPS constellation of GPS satellites. From its processing, the GPS receiver 87 supplies GPS data to the microprocessor 81, such as pseudorange measurements and associated PN codes for measured satellite signals. Associated computations may be performed in the microprocessor or by a processor or the like included in the GPS receiver, or the data may be forwarded to equipment at the TSP call center for processing to obtain a final fix (latitude and longitude coordinates) as to the location of the vehicle 13.

Normally, when there is a crash, a user activation of a panic button or other detected condition that constitutes an emergency, the telematics unit 15 dials a destination number of the TSP call center 17. The wireless communication network routes the call to the PSTN 33, and the PSTN completes the call to the TSP call center 17. Initially, the telematics unit sends relevant data, for example, to identify the unit 15 and/or the vehicle 13 as well as GPS data to locate the unit. After the data, communication switches over to voice, e.g. to allow a responder at the call center 17 to talk to a person in the vehicle 13.

Upon service deactivation, the TSP could leave the call center number in and agree to service the unit/customer in an emergency, as a good citizen. Alternatively, the TSP could opt to delete TSP destination number. Some telematics units 15 have voice dialing capability. In such a case, even if deactivated, the user could speak an instruction to cause the unit to dial 911 (e.g. hit the button and say "dial 911"). Different TSPs may opt to treat deactivated customers differently. In the examples discussed herein, service deactivation replaces the TSP destination number for center 17 with a cleared number, e.g. 911. Such reprogramming of the unit 15 directs emergency calls to the PSAP 57 via autodialing the number 911. Whether based on autodialing of a cleared number from memory or voice activated dialing, the mobile network will route a 911 call to the PSAP 57. The dummy number (in place of the MDN) will be delivered to the PSAP 57 to indicate to PSAP personnel that the device reporting the emergency is not an active device (and cannot be called back).

The structure, programming and operation of the telematics unit 15 with the TCU 63 and the NAD 63, as outlined above relative to FIGS. 2 and 3, were described to by way of example, only. Those skilled in the art will recognize that the telemantics unit 15 may be implemented and may operate in a variety of other ways.

Figure 4:
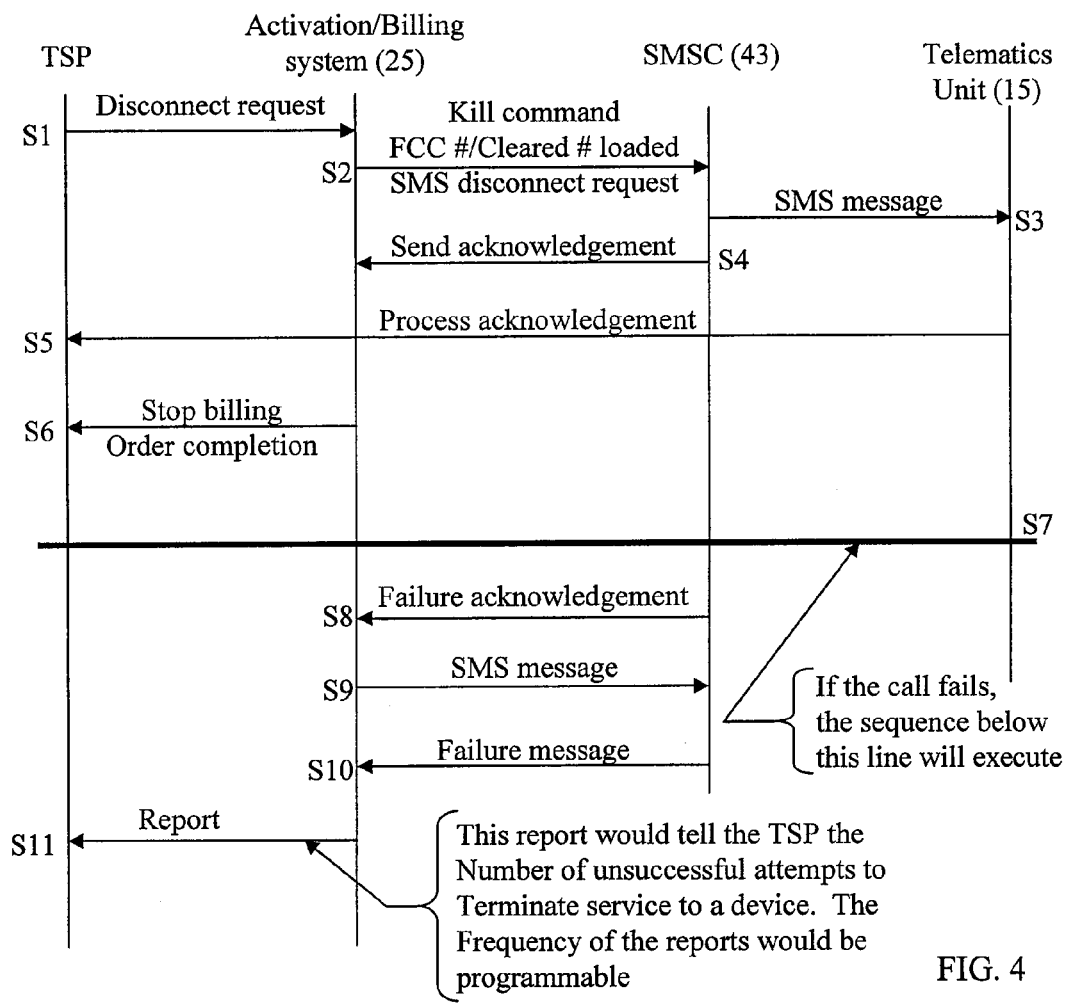
FIG. 4 is a flow chart, useful in understanding an example of the operations involved in automatic over-the-air termination of mobile network communications capability of an inactive telematics unit.

It may be helpful now to discuss an example of a process flow, for terminating service with respect to a telematics unit. FIG. 4 is a signal flow diagram of our example. Assume for discussion purposes, that the telematics customer associated with unit 15 will no longer be a subscriber of the TSPs service, e.g. the customer requested termination or stopped paying the TSP.

In the example of FIG. 4, the TSP sends a request to deactivate the service with respect to the telematics unit 15, referred to here as a "disconnect request," to the carrier's service activation/billing system 25 (step S1). In the network 10 of FIG. 1, such a disconnect request might be sent from equipment of the TSP call center 17 or other TSP data system, through the IP network 27 to the activation/billing system 25. The disconnect request identifies the particular telematics unit 15, for example, by its ESN.

Based on the identification of the particular telematics unit 15, the activation/billing system 25 can identify the appropriate record for the unit 15 and obtain information from that record for communication through the mobile network with that unit.

The process flow of FIG. 4 focuses on the deactivation communications with regard to the telematics unit 15 itself. Hence, in step S2, the activation/billing system 25 sends a deactivation command message for the telematics unit 15, here referred to as a "Kill command," to the SMSC 43. The deactivation or "Kill" command contains at least one replacement number. In the example of FIG. 4, the Kill command includes a dummy number, typically in a format specified by the FCC for PSAP reconnection of calls from disconnected or deactivated devices (FCC # in the drawing) and/or a cleared number for use as an alternate destination number by the deactivated unit 15 in the event of an emergency.

Hence, when the SMSC 43 receives a Kill command message from the activation/billing system 25, in step S3, SMSC 43 sends an SMS message containing the FCC #/Cleared # data to the telematics unit 15. Specifically, the SMSC sends the SMS Kill command message through the SS7 network 29 to the appropriate serving MSC 21, and the MSC routes the message to the appropriate base station 19 for transmission over a signaling channel to the telematics unit 15. The message is addressed using the old MDN of the unit, the HLR translates that MDN, to the old MIN; and the MSC and base station use the MIN to communicate the message to the telematics unit.

In step S4, the SMSC 43 acknowledges the "Kill command" from S2, by sending an acknowledgement message back to the billing system. If successful, the billing system 25, the telematics unit 15 and the TSP perform the deactivation processing (S5), and the billing system notifies the TSP (S6) that the carrier will stop billing for service to the particular telematics unit 15 and thus that the disconnect request order processing is completed. Although not separately shown, the activation/billing system 25 will implement appropriate actions to notify network elements (e.g. the HLR 30 and/or the home HMSC 21) to deactivate service for that unit 15, typically shortly after its communication with the telematics unit 15.

It may help to discuss the processing by the telematics unit at step S5 in somewhat more detail. The SMS message is formatted to trigger execution of a routine in the telematics unit to rewrite certain stored data, in this case to replace the MDN/MIN data with the dummy number and possible to replace the TSP call center number with a cleared number such as 911. Upon receipt by the telematics unit 15, the SMS Kill command message therefore causes the microprocessor 81 (FIG. 2) to wake-up the service termination/activation application in program storage 95. Based on the Kill command, the microprocessor 81 executes that program in a manner to terminate wireless services through the network. For example, the microprocessor 81 responds by deleting the assigned number data (MIN and/or MDN) from the NAM storage 91 and deletes the destination number(s) from the number storage 93. The microprocessor 81 replaces the data deleted from the NAM storage 91 with the FCC # (dummy number) received in the SMS Kill command message; and the microprocessor 81 replaces the data deleted from the destination number storage 93 with the Cleared # received in the SMS Kill command message. Hence, the telematics unit will be configured to use the FCC # (dummy number) for signaling and the Cleared # as a dialed destination number, for future emergency communications (if any) through the wireless communication network, i.e. while the telematics unit 15 is inactive with respect to communication service through the mobile communication network.

In the discussion of steps S3-S6 (FIG. 4), it was assumed that the SMS message was successfully communicated through the network to the appropriate telematics unit 15. However, as with other SMS message transmissions, the communication to the telematics unit 15 may not always succeed on a single attempt. The solid line at S7 represents a demarcation in process flow, based on whether or not the first attempt at S3 was successful. In the event the first attempt at S3 fails, processing flows to the steps below the demarcation line S7. Hence, at S8, the SMSC 43 sends an acknowledgement message back to the activation/billing system 25 (acknowledging the S2 Kill command message), but at S8, the acknowledgement indicates that the SMS message delivery to the telematics unit 15 has failed.

Typically, the activation/billing system 25 will wait for some period of delay and attempt a service termination command again. Hence, at S9, the activation/billing system 25 sends another message for SMS communication with the unit 15, to the SMSC. This message would be the same the "Kill command" FCC #/Cleared # loaded SMS disconnect request as sent to the SMSC 43 in step S2. Although not separately shown, the SMSC 43 sends an SMS message to the telematics unit 15 essentially as was done in S3. If the subsequent attempt succeeds, the processing would be similar to steps S4 to S6 discussed above. However, if the new SMS transmission attempt fails, the SMSC 43 sends another failure message back to the activation/billing system 25, similar to the S8 failure acknowledgement. Further attempts may be made at various intervals, e.g. by periodically repeating step S9, and the failure message at S10 will be repeatedly sent back as long as the telematics unit does not receive and act on the Kill command.

After some number of failed attempts, the activation/billing system 25 will report to the TSP as shown at S11. This report, for example, may tell the TSP the number of unsuccessful attempts to terminate service to a particular telematics unit 15. The frequency and content of such the reports would be programmable.

A number of the operations described above may be carried out by execution of programming code in the form of software, firmware, or microcode running on one or more of the controllers of the telematics units 15 and/or by processing of relevant data on such programmable devices. The software functionalities involve programming, including executable code as well as associated stored data, for causing the telematics units 15 to implement emergency detection and reporting as well as the deactivation related functions, as exemplified by the discussions above. Code for implementing the normal telematics operations and the service deactivation operations may be in the form of computer instruction in any form (e.g. source code, object code, interpreted code, etc.) stored in or carried by any computer or machine-readable medium. In operation, the executable code is stored in an area of memory or the like within the respective telematics unit 15. At other times, however, the programming may be stored at other locations and/or transported for loading into respective equipment, e.g. into the particular unit from a server or the like.

Hence, implementations of the teachings presented herein typically involve one or more software products in the form of one or more modules of executable code and/or data carried by at least one machine readable. Execution of such code by a processor or the like of a telematics unit for example to implement steps such as outlined above, to delete number data from storage in the telematics unit and replace it with new data in response to a deactivation instruction message from the network.

As used herein, terms such as computer or machine "readable medium" refer to any tangible medium that participates in providing instructions and/or data to a processor. Such a medium may take many forms, including but not limited to, volatile or non-volatile storage media and transmission media. Non-volatile storage media include, for example, optical or magnetic disks, such as flash memory 83 of the NAD 63 of FIGS. 2 and 3 as well as storage devices in any server or computer(s), switches or routers that may be used to store programming for downloading into the telematics unit. Volatile storage media include dynamic memory, such as RAM in the NAD or main memory of a computer platform such as a program server. Physical transmission media include coaxial cables; copper wire and fiber optics, including the wires that comprise a bus within a computer system/server. Carrier-wave transmission media can take the form of electric or electromagnetic signals, or light waves, such as those generated during radio frequency (RF) and infrared (IR) data communications over wireline and wireless links of the mobile communication network. Many of these forms of computer readable media may be involved in carrying one or more sequences of one or more instructions to a processor for storage and/or execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of deactivating a telematics unit with respect to communication service through a wireless communication network, comprising steps of:

receiving a request to deactivate the communication service in a wireless communication network in a system of an operator of the wireless communication network from a telematics service provider, the request identifying the telematics unit;

in response to the request, generating a deactivation command message for the telematics unit, the deactivation command message containing at least one replacement number;

transmitting the deactivation command message from the system of the operator of the wireless communication network, through the wireless communication network to the telematics unit;

receiving the deactivation command message in the telematics unit from the wireless communication network;

responsive to the received deactivation command message, deleting a destination number used to determine a destination of a communication from the telematics unit through the wireless communication network when the telematics unit is active for wireless service and telematics service from storage in memory of the telematics unit; and storing a replacement destination number from the received deactivation command message, in the memory of the telematics unit in place of the deleted destination number, for use in a future attempt of the telematics unit to determine a destination of a communication from the telematics unit through the wireless communication network when the telematics unit is inactive with respect to communication service through the wireless communication network.

2. The method of claim 1, further comprising:

responsive to the received deactivation command message, deleting a mobile number assigned to the telematics unit by an operator of the wireless communication network when the telematics unit was active; and replacing the deleted mobile number with a dummy mobile number.

3. The method of claim 2, wherein the deleted mobile number is one or more of a mobile directory number (MDN) and a mobile identification number (MIN).

4. The method of claim 1, wherein:

the deleted destination number is a directory number of a telematics call center for automatic dialing in response to detection of an emergency by the telematics unit to establish a call for communications between the telematics unit and the telematics call center through the wireless communication network; and the stored replacement destination number comprises a cleared number.

5. The method of claim 4, wherein the cleared number is 911.

6. A method of deactivating a telematics unit with respect to communication service through a wireless communication network, comprising steps of:

receiving a deactivation command message in the telematics unit from a system of an operator of the wireless communication network, through the wireless communication network, the deactivation command message containing at least one replacement number;

deleting a destination number used to determine a destination of a communication from the telematics unit through the wireless communication network when the telematics unit is active for wireless service and telematics service from storage in memory of the telematics unit; and storing a replacement destination number from the received deactivation command message, in the memory of the telematics unit in place of the deleted destination number, for use in a future attempt of the telematics unit to determine a destination of a communication from the telematics unit through the wireless communication network when the telematics unit is inactive with respect to communication service through the wireless communication network.

7. The method of claim 6, further comprising the step of:
deleting a mobile number assigned to the telematics unit by an operator of the wireless communication network when the telematics unit was active; and
replacing the deleted mobile number with a dummy mobile number.

8. The method of claim 7, wherein the deleted mobile number is one or more of a mobile directory number (MDN) and a mobile identification number (MIN).

9. The method of claim 6, wherein:
the deleted destination number is a directory number of a telematics call center for automatic dialing in response to detection of an emergency by the telematics unit to establish a call for communications between the telematics unit and the telematics call center through the wireless communication network; and
the stored replacement destination number comprises a cleared number.

10. The method of claim 9, wherein the cleared number is 911.

11. A telematics unit, comprising:
a wireless transceiver for wireless communications through a wireless communication network;
a memory for storing a destination number used for determining a destination of a communication through the wireless communication network; and
a microprocessor for:
deleting the destination number used to determine the destination of a communication from the telematics unit through the wireless communication network from storage in the memory when a deactivation command message is received via the wireless transceiver,
wherein when the telematics unit is active for wireless service and telematics service, the destination number is a directory number of a telematics call center; and
storing a replacement number from the received deactivation command message, in the memory of the telematics unit in place of the deleted destination number, for use in a future attempt of the telematics unit to determine a destination of a communication from the telematics unit through the wireless communication network when the telematics unit is inactive with respect to communication service through the wireless communication network.

12. The telematics unit of claim 11, wherein:
the memory further stores a mobile number assigned to the telematics unit by an operator of the wireless communication network when the telematics unit was active,
the microprocessor further deletes the mobile number when the deactivation command message is received, and
the microprocessor further replaces the deleted mobile number with a dummy mobile number.

13. The telematics unit of claim 12, wherein the deleted mobile number is one or more of a mobile directory number (MDN) and a mobile identification number (MIN).

14. The telematics unit of claim 11, wherein the stored replacement number comprises a cleared number.

15. The telematics unit of claim 14, wherein the cleared number is 911.

* * * * *